June 18, 1963  J. BOEKE ETAL  3,094,062
WATERMELON CUTTER-PRESS
Filed Sept. 21, 1961  2 Sheets-Sheet 2
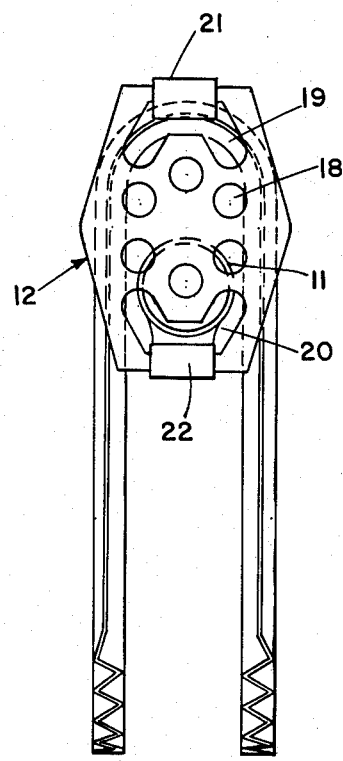
FIG. V
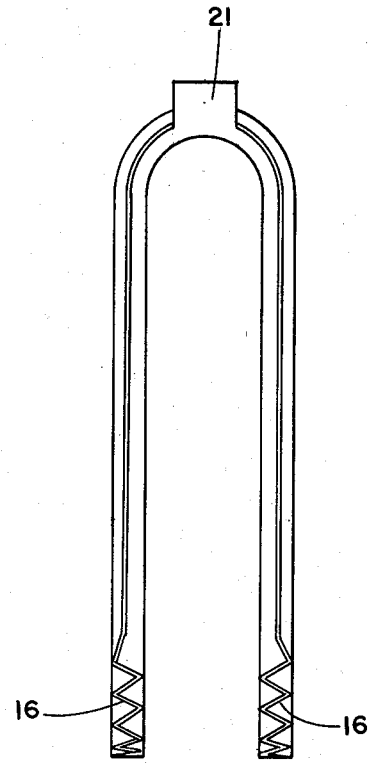
FIG. VI
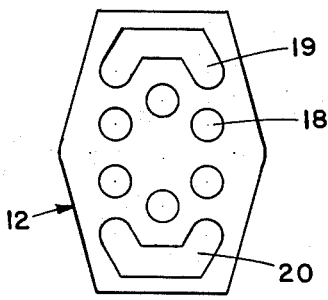
FIG. VII
INVENTORS
JAN BOEKE
JOE N. WELCH
BY
Lawrence H. Poston
AGENT

United States Patent Office 3,094,062
Patented June 18, 1963

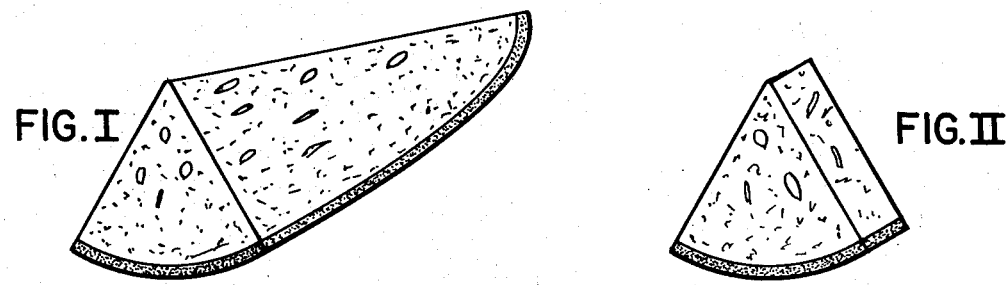
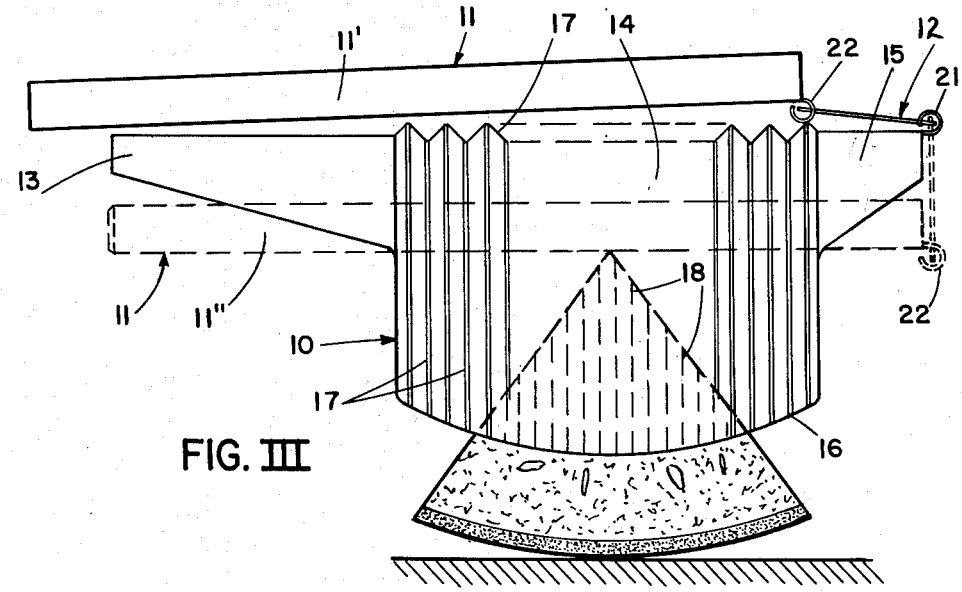
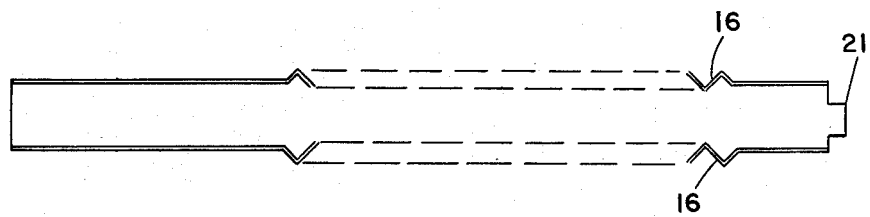
INVENTORS
JAN BOEKE
JOE N. WELCH
BY
AGENT

3,094,062
WATERMELON CUTTER-PRESS
Jan Boeke, 70 Monument St., Concord, Mass., and Joe N. Welch, 129 Plimpton St., Walpole, Mass.
Filed Sept. 21, 1961, Ser. No. 139,646
1 Claim. (Cl. 100—94)

This invention relates to watermelon processing devices, and has particular reference to means for slicing watermelon in a novel manner, and to means for slicing, and juicing by pressing, watermelon sections.

Watermelons and their juice have their own special qualities, attractive to many. Watermelon slices have long been a special delicacy. Watermelon juice is a treat which many are beginning to appreciate, as a drink by itself, or mixed with other beverages, for example, mixed alcoholic drinks.

This invention provides means for readily obtaining watermelon slices or juices, this means being a useful, attractive implement for kitchen, bar, or barbecue.

Many foods are rendered more attractive by special shaping or forming, and the device of this invention provides means for readily, simply and inexpensively producing a new form of watermelon slices. This new form is a side surface serration formed by a slicer of special form and configuration according to this invention. Thus the lowly ordinary watermelon slice is given a touch of glamor so it may do its part to enliven the festive board.

Further, the social world is always seeking new tastes and taste combinations, as well as new availabilities, of old or little appreciated staples, such as watermelon juice or combinations of watermelon juice with other beverages. This invention provides means for making such juices readily and conveniently available.

It is therefore an object of this invention to provide a new and useful watermelon processing device.

Other objects and advantages of this invention will be in part apparent and in part pointed out hereinafter, and in the accompanying drawings, wherein:

FIGURE I illustrates an eighth section of a watermelon as the ordinary basic cut from a whole, and as the section to which the device of this invention is applied;

FIGURE II shows a watermelon slice resulting from the use of the slicing device of this invention on a watermelon section as illustrated in FIGURE I;

FIGURE III is a side elevation of a slicer-squeezer device according to this invention;

FIGURE IV is a bottom view outline of the bottom edge of the structure of FIGURE III;

FIGURE V is a right end view of the structure of FIGURE III;

FIGURE VI is a right end view of the slicer portion of FIGURE IV, viewed alone; and FIGURE VII is a right hand view of the juicer plate of FIGURE III, viewed alone.

The FIGURE I and II showings are simply illustrative of the nature of the operation of the device according to this invention as exemplified in assembly in FIGURE III.

The device of FIGURE III comprises, generally, a slicer arm 10, a squeezer arm 11, and a juicer plate 12 as a pivotal connecting member for joining the slicer and squeezer arms.

The slicer arm 10 is U shaped, with a U inverted as seen in FIGURE III. That is, the base of the U is at the top of the figure and the mouth is at the bottom of the figure. This disposition as well as the U shape, is illustrated in the end views, FIGURES V and VI.

The slicer 10, as an arm, is horizontally disposed in the drawing, FIGURE III, with a handle 13 at the left, the U body in the center as at 14, and a pivot boss 15 at the right. The handle 13 and the pivot boss 15 are also U-shaped in lateral continuation of the U shape of the slicer body 14. The depth of the U shape is less in the handle 13 and the pivot boss 15, and this depth tapers to a lesser end depth, from the main cutter body 14 outwardly to the end of the slicer arm, in both the handle 13 and the pivot boss 15.

At the bottom of FIGURE III, a dotted representation of an end view of the FIGURE I watermelon section is shown with the U cutter body 14 partially cut into the section so the peak of the slice is already contained between the walls of the U slicer. The further action of the slicer is downward until a full watermelon triangular slice is contained within the slicer U, including the curved base strip of watermelon rind.

The mouth of the U slicer is a pair of parallel, curved slicer edges as indicated at 16. These edges are formed in fixed pleats by an arrangement of parallel, triangular cross-section slicer grooves 17 which, as in FIGURE III, provide the slicer body 14 with U form slicer serrations, following the U form of the slicer body 14.

The slicer grooves 17 provide vertical V groove serrations 18 in the watermelon slice as the slicer body 14 is moved downwardly, to provide attractive appearance and juice channels in the watermelon slice.

A few only of the grooves 17 are shown, but they extend fully throughout the body 14 of the U slicer, much as a few gear teeth are shown in a standard gear drawing (not shown) to indicate a full complement of that type of teeth on the gear.

In the processing of the watermelon, after the full slice is contained between the walls of the U slicer body 14, the slice may be removed for eating in that form. For this purpose, a slight taper, (not shown because it need not be great) may be provided in the slicer U body 14. That is, the mouth of the U is slightly wider than the base thereof. For the most part, it is sufficient to slightly spring apart the parallel walls of the U in order to have the watermelon slice drop out.

On the other hand, if the abovementioned slice within the slicer U is to be squeezed for juice, the squeezer arm 11 is brought into operation.

While the slicing operating is being accomplished, the squeezer arm 11 is located above the slicer, out of the way as indicated at 11', FIGURE III. When the squeezing is finished the squeezer arm 11 is located (11") within the U slicer and adjacent the base (top portion) thereof.

Thus the squeezer arm 11 is pivotable from an out of the way location 11' to a finished, nesting location 11" within the U slicer and essentially transversely filling the U slicer. The squeezer arm 11 pivots about the right end of the device and approaches the slicer U from below, that is, into the mouth of the U, thus pressing upward against the outside of the rind of the watermelon slice within the slicer U. The U slicer serrations 17 help hold and contain the watermelon slice while the squeezing operation is being carried out. When the squeezing is finished, the squeezer arm 11 is pivoted downwardly out of the slicer U and the remaining watermelon rind, pulp, and seeds may then be removed from the slicer.

While the squeezing is going on, the whole device may be tipped to make the general disposition partly vertical instead of the horizontal disposition as in FIGURE III. Thus the slicer handle 13 and the left end of the squeezer arm 11 now are at the top of the device. Consequently, the juice runs out of the then bottom of the device through the U channel in the pivot boss 15, and through the juicer plate 12 through openings 18 therein which pass juice and trap pulp and seeds.

The juicer plate 12 has the further function of acting as a pivot plate for joining the right hand ends (FIGURE III) of the slicer arm 10 and the squeezer arm 11. The juicer plate has upper and lower openings 19 and 20 for this purpose. The slicer and squeezer arms 10 and 11 are provided with curled end hinge lips 21 and 22 which are wrapped around the upper and lower portions of the juicer plate 12 through the openings 19 and 20 to provide a hinged relationships suitable for pivoting the squeezer arm 11 in and out of action.

Note that in the course of such pivotal action, the juicer plate 12 is moved in and out of operative location and position as part of the movement which changes the location of the squeezer arm 11. The squeezer arm may, for example, be a cylindrical tube as indicated in the end view of FIGURE V at 11.

This invention, therefore, provides a new and useful watermelon processing device.

As many embodiments may be made of the above invention, and as changes may be made in the embodiments set forth above without departing from the scope of the invention, it is to be understood that all matter hereinbefore set forth or shown in the accompanying drawings is to be interpreted as illustrative only and not in a limiting sense.

We claim:

A watermelon processing device comprising, in combination, a U-shaped channel cutter wherein the mouth of the channel is convex lengthwise of said cutter, said cutter being provided with V-shaped cutting serrations following the U form of the cutter, a handle at one end of the said cutter, a juice plate at the other end of said cutter, said plate having openings therein to pass juice and trap seeds, a first hinge on the bight portion of said U-shaped cutter, said juice plate being mounted on said hinge on one of the edges of said plate and transversely of said cutter, and a squeezer arm formed to move within and essentially fill said U-shaped cutter, said squeezer arm being adapted for nesting relation in said cutter during the operation of said squeezer and to lie along the outside top of said cutter when out of operation, a second hinge on said squeezer arm, said juicer plate being mounted on said second hinge on the opposite edge of said juicer plate with respect to said first hinge, whereby said squeezer arm may be pivoted in and out of said U-shaped cutter, with said juice plate adapted to swing down and partially block the opening formed between said bight portion and said squeezer arm when said squeezer arm is in its nested, operative position within the U-shaped cutter, said juice plate, further, being adapted to swing up and over, through said hinges, to lie along the top of said U-shaped cutter bight, when said squeezer arm is in its inoperative position, along the top of U-shaped cutter.

References Cited in the file of this patent

UNITED STATES PATENTS

| | | |
|---|---|---|
| 276,424 | Kelly et al. | Apr. 24, 1883 |
| 358,022 | Dickson | Feb. 22, 1887 |
| 574,413 | Graves | Jan. 5, 1897 |
| 594,728 | Cox et al. | Nov. 30, 1897 |
| 457,478 | Williams et al. | June 5, 1923 |
| 1,888,281 | McKinstry | Nov. 22, 1932 |
| 2,309,814 | Youngberg | Feb. 2, 1943 |
| 2,602,483 | Graham | July 8, 1952 |

FOREIGN PATENTS

| | | |
|---|---|---|
| 205,862 | Germany | Jan. 20, 1909 |
| 556,253 | Italy | Feb. 4, 1957 |